United States Patent [19]
de Rosa

[11] 4,007,802
[45] Feb. 15, 1977

[54] REMOTE CONTROL DEVICE FOR SAFETY HARNESS WEBBING WINDER

[75] Inventor: Daniel de Rosa, Boulogne-Billancourt, France

[73] Assignees: Regie Nationale des Usines Renault; Societe Anonymedite: Automobiles Peugeot, Paris, both of France

[22] Filed: July 17, 1975

[21] Appl. No.: 596,627

[30] Foreign Application Priority Data

July 24, 1974 France .................. 74.25687

[52] U.S. Cl. .................. 180/82 C; 180/111; 242/107.4 A; 280/744
[51] Int. Cl.$^2$ .................. B60R 21/00
[58] Field of Search ......... 180/82 C, 111, 103 A, 180/114; 280/744–747; 242/107.4 A

[56] References Cited
UNITED STATES PATENTS 3,840,088  10/1974  Marumo et al. ......... 180/103 A X
3,917,019  11/1975  Pearson et al. ......... 180/82 C Primary Examiner—Philip Goodman
Assistant Examiner—Terrance L. Siemens
Attorney, Agent, or Firm—Fleit & Jacobson

[57] ABSTRACT

This device is intended for remotely controlling the winder of safety harness webbing of vehicles, each winder comprising an unwinding member and a member for locking said unwinding member which is mounted on a movable component element of the vehicle body, and an inertia member adapted to control mechanically said locking member in conjunction with an electrically energized solenoid. This solenoid induces an electromagnetic force acting with a certain time lag and substantially in the same direction as the gravity applied to said inertia member, the retarded action of said electromagnetic force being responsive to the movement of said movable element of the vehicle body.

2 Claims, 3 Drawing Figures

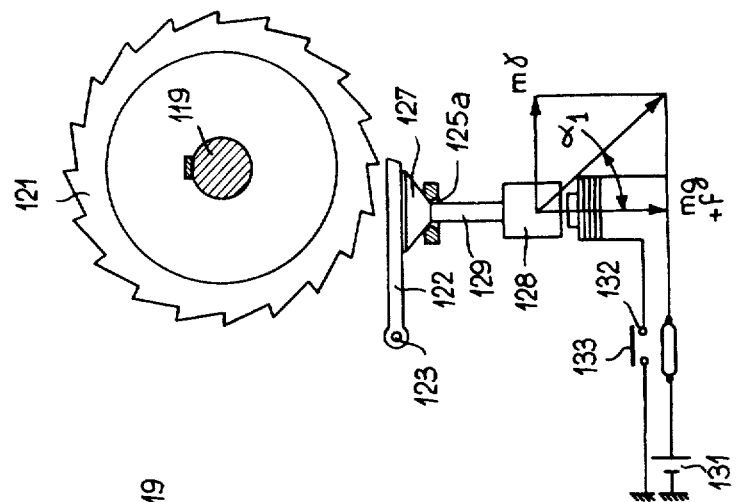
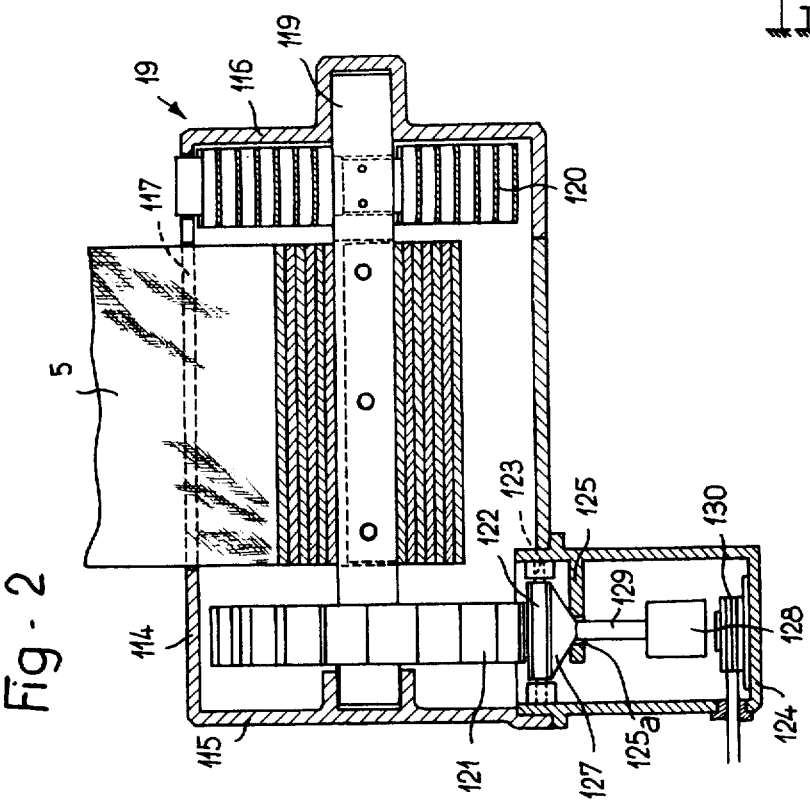

REMOTE CONTROL DEVICE FOR SAFETY HARNESS WEBBING WINDER

The present invention relates to improvements in or relating to remote control devices for the automatic winders of safety harness webbings provided with locking means.

Automatic winders for safety harness webbings permitting a considerable liberty of movement to the occupant of a seat of a vehicle as long as no abnormal conditions develop during the operation of the vehicle are already known. In case of such abnormal operation a remote control device locks the winding off of the safety webbing from the winder to avoid any uncontrolled movement of the occupant of the seat.

Locking devices operating by inertia and adapted to lock a safety webbing against unwinding when the vehicle decelerations exceed a predetermined threshold are already known in the art. Thus, a relatively heavy pendulum controlling directly by means of mechanical members the winder drum locking member operates according to this principle.

If the winder is mounted on a movable element of the vehicle body, notably a side door, the inertia-operated locking device can lock the unwinding member, for example the winder drum or coil, during the door opening movement. Now this accidental locking of the winder drum or coil discontinues the door opening movement and interferes considerably with the stepping in or out of the vehicle passengers.

It is the chief object of the present invention to provide an electric remote control device for operating the webbing winders of safety harnesses, this control device being adapted, during the door opening movement, to reduce the sensitivity of the winder.

To this end, the electric control device is associated with a winder comprising an unwinding member and means adapted to lock this member, an inertia member adapted mechanically to control said locking means and a solenoid adapted to be energized electrically, the electromagnetic force of said solenoid being capable of temporarily modifying the winder operation. According to this invention, the electromagnetic force induced by the solenoid operates with a certain time-lag and substantially in the same direction as the gravity force exerted on the inertia member, the delayed-action electromagnetic force being responsive to the movement of said movable body element, for instance a door.

With a device so constructed the sensitivity of the winder can be reduced appreciably.

In order to afford a clearer understanding of the present invention and of the manner in which the same may be carried out in practice, a typical form of embodiment thereof will now be described by way of example with reference to the attached drawing, in which:

FIG. 2 is a section showing on a larger scale the winder of FIG. 1, and

FIG. 3 illustrates diagrammatically various component elements of the winder of FIG. 1 in order to illustrate the mode of operation of the device.

Figure 1:
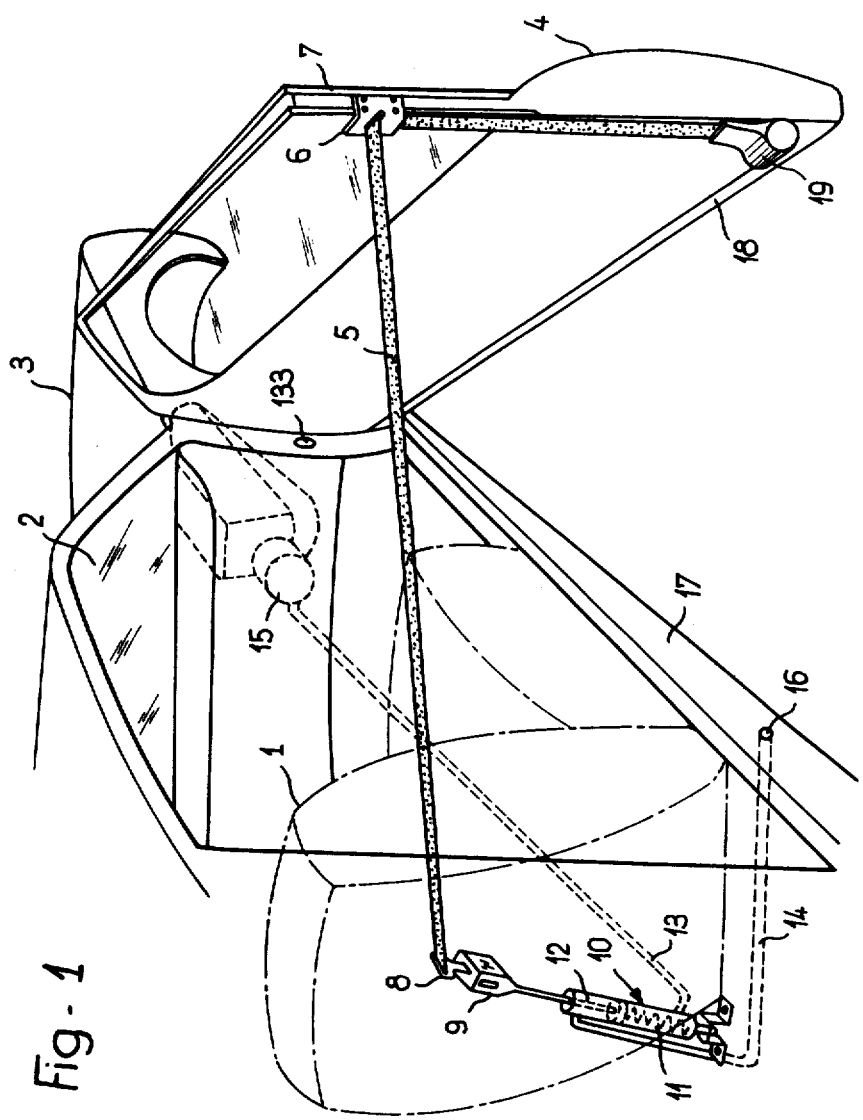
FIG. 1 is a diagrammatic perspective view of a vehicle of which the safety harness webbing winder is mounted on the door adjacent the seat concerned.

Referring first to FIG. 1, the vehicle of which the body is designated generally by the reference numeral 3 comprises a seat 1 mounted in the passenger compartment 2, and in this example the movable body element consists of a door 4 adjacent the seat 1. The passenger compartment 2 encloses a device for retaining the passenger's knees. The safety harness or belt comprises a webbing 5 adapted to slide through the keeper associated with the upper lateral anchorage member 6 secured to the frame 7 of the side window. The harness consists in this example of a simple shoulder-belt shown in the position assumed thereby when the vehicle door is open.

The inner end of the harness is rigid with a bolt-like male member 8 adapted to engage the buckle 9 rigid in turn with the piston rod of a pneumatic cylinder 10.

The piston of this pneumatic cylinder 10 divides the latter into two chambers 11, 12 connected to a suction line 13 and to an exhaust line 14, respectively. The suction line 13 is connected to a source of vacuum 15 and the exhaust line opens into the free atmosphere via a port 16 formed through the lower side longitudinal member 17 of the vehicle frame, this port 16 being adapted to be closed tightly by the inner wall 18 of door 4.

The winder 19 secured to the lower inner portion of door 4 is shown more in detail in FIG. 2.

Referring now jointly to FIGS. 2 and 3, the reference numeral 114 designates the case of winder 19, which comprises two end covers 115 and 116 and a longitudinal slot 117 permitting the passage of the webbing 5 which, in FIG. 2, is shown as being partly wound on the core or shaft 119 of this winder. The two ends of shaft 119 are journalled in said end covers 115 and 116. The shaft 119 has anchored thereto at one end a spiral return spring 120 having its opposite end secured to the case 114. This spiral spring 120 is pre-stressed so as to exert a permanent winding force on the webbing 5.

A ratchet wheel 121 is also rotatably rigid with the shaft 119 and adapted to co-act with a pawl 122 pivoted to a small shaft 123 carried by the inner wall of a small case 124 secured to the main case 114.

The auxiliary case 124 comprises an inner support 125 in which an orifice 125a is formed. This orifice 125a is engaged by a frustoconical head 127 of an inertia member 128. This inertia member 128 is a relatively heavy body connected by a rod 129 to said head 127.

Within the auxiliary case 124 is disposed a solenoid 130 having its current supply wires connected to the positive terminal of the storage battery 131 of the vehicle and to the fixed contact stud 132 of a switch 133 adapted to close automatically and to remain closed as long as the door 4 remains open; therefore, this switch 133 is normally closed during the door opening movement. The switch 133 may advantageously consist of a door-jamb switch mounted in the frame surrounding the door 4.

The safety harness operates as follows. Let $m$ be the mass of the inertia member 128 and $\gamma$ the acceleration imparted to this mass $m$ during the door opening movement, the sensitivity of a conventional winder is determined by the formula:

$$s = tg\ \alpha = m\ \gamma/mg$$

With the winder according to this invention the electromagnetic force $f$ induced by the solenoid 130 and applied to the inertia member 128 reduces the sensitivity of the winder which, in this case, becomes:

$s_1 = tg\ \alpha_1 = m\ \gamma/(mg+f)$

The characteristics of solenoid 130 are such that the combined electromagnetic and inertia forces exerted on the inertia member 128 are sufficient for preventing the ratchet wheel 121 from being locked by the pawl 122 during the movement of door 4. Since the above-mentioned switch 133 remains closed only during the door movement, the action exerted by the electromagnetic force on the inertia member of the winder is only temporary.

Reverting to FIG. 1, it will be seen that the chamber 12 of cylinder 10 is vented to the atmosphere during the door opening movement. Thus, the buckle 9 is moved upwards by the force of compression spring controlling the piston in this cylinder.

The device for raising the buckle 9 by means of the spring contained in cylinder 10 may be replaced by a system comprising a flexible Bowden cable so as to impart a certain elasticity to the device. If desired, this cable may be anchored directly to the floor of the vehicle and support the buckle 9. It is clear that during the door opening movement the release of the wire or cable supporting the buckle 9 is sufficient to move the buckle away from the passenger's body, thus facilitating the movement of the passenger stepping out from the vehicle.

The device for remote controlling the winders may advantageously be associated with a well-known interlock system for safety belts and harnesses which prevents the driver from starting the engine unless he has properly fitted the harness or belt to his body.

Of course, the shape and type of the inertia member 128 should not be construed as being strictly limited to the specific shape and type illustrated in this example, since various modifications and/or substitutions may be contemplated in the practical embodiment of certain components of the device of this invention without departing from the basic principle of the invention.

What is claimed as new is:

1. Electric remote control device for operating the winders of safety harness webbing of the type comprising a winder incorporating a webbing unwinding means and a member for locking said unwinding means mounted on a movable component of the vehicle body, an inertia member adapted mechanically to control said locking member and a solenoid adapted to be energized electrically, the electromagnetic force of said solenoid being adapted to modify temporarily the operation of said inertia member, this device being characterized in that said solenoid induces an electromagnetic force acting with a certain time-lag and substantially in the same direction as the gravity force applied to said inertia member.

2. Electric remove control device according to claim 1, characterized in that said solenoid is secured in the vicinity of said inertia member and mounted in a case supporting said inertia member.

* * * * *